… …

United States Patent [19]

Kurihara et al.

[11] Patent Number: 5,304,415
[45] Date of Patent: Apr. 19, 1994

[54] SOUND ABSORPTIVE MATERIAL

[75] Inventors: Yoshitaka Kurihara; Yuzo Okudaira; Hideyuki Ando; Wakio Yamada; Kazunori Umeoka; Takashi Nakai, all of Kadoma, Japan

[73] Assignee: Matsushita Electric Works, Ltd., Osaka, Japan

[21] Appl. No.: 868,130

[22] Filed: Apr. 14, 1992

[30] Foreign Application Priority Data

Apr. 15, 1991 [JP] Japan ................................ 3-082674
Jul. 24, 1991 [JP] Japan ................................ 3-184873

[51] Int. Cl.$^5$ .............................................. B32B 9/00
[52] U.S. Cl. ..................................... 428/328; 428/161; 428/172; 428/323; 428/338; 181/290; 181/284
[58] Field of Search ............... 428/323, 161, 328, 172, 428/338; 181/290, 284, 286, 288, 293, 204

[56] References Cited

U.S. PATENT DOCUMENTS

| 4,113,053 | 9/1978 | Matsumoto et al. | 181/284 |
| 4,386,676 | 6/1983 | Gadde et al. | 181/290 |
| 5,164,260 | 11/1992 | Yoshinaka et al. | 428/328 |

FOREIGN PATENT DOCUMENTS

61-40941 2/1986 Japan .

Primary Examiner—Patrick J. Ryan
Assistant Examiner—Abraham Bahta
Attorney, Agent, or Firm—Leydig, Voit & Mayer

[57] ABSTRACT

A sound absorptive material has powder particles having a sound absorption characteristics at a low frequency and generally supported in a vibratable state by a porous support, whereby the sound absorptive material can be increased in the sound absorption coefficient in the low frequency range while maintaining the absorptive material to be thin.

20 Claims, 9 Drawing Sheets

SOUND ABSORPTIVE MATERIAL

BACKGROUND OF THE INVENTION

This invention relates to a sound absorptive material.

The particular sound absorptive material finds its utility when employed as a wallboard or the like interior material for making a room which is required to possess excellent the acoustic properties, as a filler material for a hollow part in a double structure installation which is required to have good sound insulating properties and as an inner liner of sound absorbing ducts, soundproof covers for use with noise-generating machines, instruments, and so on.

DESCRIPTION OF RELATED ART

Sound absorptive material has been employed as an interior material for use in making audio-listening rooms, practice rooms for music instruments, hotels, condominiums, conference rooms and so on where excellent acoustic properties are demanded required, sound absorptive material has been also used as an inner liner of sound absorbing ducts, soundproof covers for use with noise-generating machines, instruments, and so on.

For sound absorptive material in these instances, such porous members as foamed urethanes, glass-wool and the like have been used so that, upon incidence of sound waves on foams or pores of such sound absorptive material, a continuity of complicated sectional configuration of the foams or pores in the foamed urethanes or glass-wool cause the sound pressure wave to be reduced due to viscosity friction yielded by walls of the foams or pores while the sound wave propagates through the foams or pores, and eventually the sound wave energy can be absorbed.

The porous members including the foamed urethanes and glass-wool show, on the other hand, a tendency for a higher sound absorption coefficient as the sound wave frequency rises but a low coefficient with respect to the sound wave in a lower frequency range. In this event, an increment in the thickness of the porous member may raise the sound absorption coefficient in the low frequency range. However, the increased thickness of the porous member causes a problem in that the interior material of such porous member reduces the space of the room and when used as an inner liner reduces the inner diameter of the duct, that is, intraduct flow path.

U.S. Pat. No. 4,386,676 of Villy Gadde et al, suggests a sound absorbing mat comprising a flexible porous layer with particles of a higher specific gravity such as a metal concentration, crushed mineral material, sand or the like and filling open pores of the layer over a part of the thickness of the layer. With this arrangement, the mat has improved soundproofing by an increased surface density and also in the sound absorbing effect by remaining part unfilled with the particles. Further, in Japanese Patent Laid-Open Publication JP-A 61-40941 of Y. Tomoto et al, there has been disclosed a soundproof material with a base having a large number of independent voids which are filled with powdery or particulate such as sand as an attempt to improve the sound insulating properties.

However, there has been suggested no measures for improving the sound absorption coefficient in the low frequency range for which there is a keen demand.

SUMMARY OF THE INVENTION

Accordingly, a primary object of the present invention is to provide a sound absorptive material which has a small thickness and is still capable of increasing the sound absorption coefficient in the low sound frequency range to a sufficiently satisfactory extent.

According to the present invention, this object can be realized by a sound absorptive material wherein at least a layer of powder paricles having sound absorbing characteristics in a lower sound frequency range is generally contained in at least a porous support in vibratable state.

Other objects and advantages of the present invention shall become clear as the description of the invention advances as detailed with reference to embodiments shown in accompanying drawings.

While the present invention would be now explained with reference to the embodiments shown in the drawings, it should be appreciated that the intention is not to limit the invention only to these embodiments shown but rather to include all alterations, modifications and equivalent arrangements possible within the scope of appended claims.

DETAILED DESCRIPTION OF PREFERRED EMBODIMENTS

According to a remarkable feature of the present invention, an improved sound absorption coefficient is attained in the low frequency range of the sound wave to be absorbed. The present invention provides a sound absorptive material which shows improvement in room acoustic characteristics and sound insulating properties when employed as the interior material as well as effective restraint of noise when utilized as the inner liner. The material thickness is not increased but is maintained to be relatively thin. In the present instance, a porous support as the base of the sound absorptive material is made to contain powder particles in vibratable state to utilize the vibration of the powder particles.

Figure 3A:
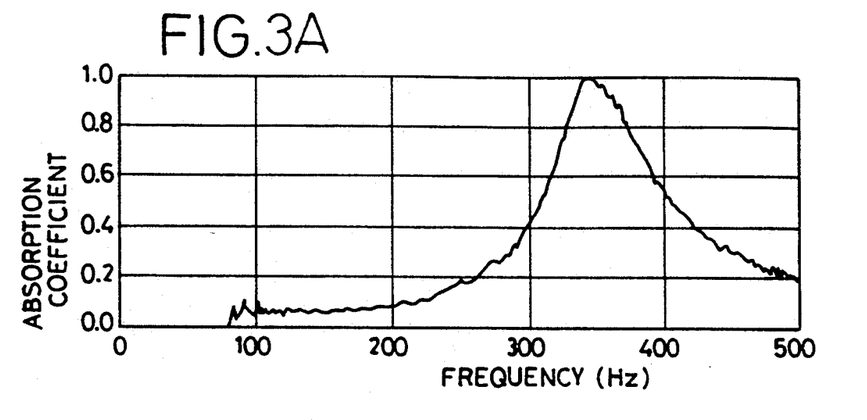
FIGS. 3, 3A and 4 are diagrams showing characteristics of the sound absorption coefficient with respect to the sound frequency of different powder particle layers employed in the sound absorptive materials according to the present invention.
Figure 3B:
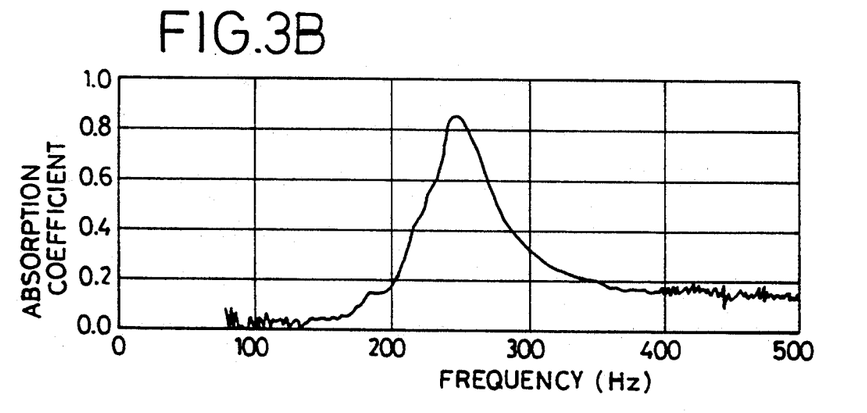
Figure 5:
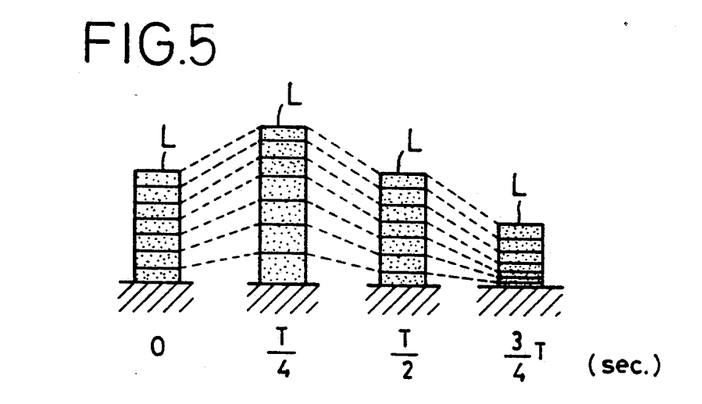
FIG. 5 is an explanatory view for vibratory motion in the thickness direction of the powder particle layer employed in the sound absorptive material of the present invention.

While various types of powder particles can be employed, a 30 mm thick layer of calcium silicate powder particles of, for example, an average particle diameter of 25 $\mu$m, true density of 2.52 g/cm$^3$, bulk density of 0.080 g/cm$^3$ and void volume of 0.97 has been subjected to measurement of characteristics of the sound absorption coefficient with respect to the frequency, the result of which has been represented by such solid line curve as shown in FIG. 3A. Further, a 30 mm thick layer of precipitated silica powder particles of an average particle diameter of 150 $\mu$m, true density of 2.1 g/cm$^3$, bulk density of 0.282 g/cm$^3$ and void volume of 0.87 has been subjected to measurement of characteristics of the sound absorption coefficient with respect to the frequency, the result of which has been shown by a solid line curve in FIG. 3B. The sound absorption coefficient was measured in accordance with Japanese Industrial Standard (JIS) A 1405. As will be clear from both of FIGS. 3A and 3B, an absorption peak exists in a frequency range lower than 500 Hz in both of them, and it should be appreciated that these powder particles are of a high sound absorption coefficient in the lower frequency range. It has been found that, at the absorption peak, the sound in a lower frequency range can be effectively absorbed by the powder particles in such layer L as shown in FIG. 5 which vibrates in a longitudinal vibration mode (in the thickness direction). For the powder particles, a brass foil powder (z in FIG. 8) of an average flake diameter of 10 $\mu$m and an average thickness of 0.25 $\mu$m may also be employed.

Figure 4:
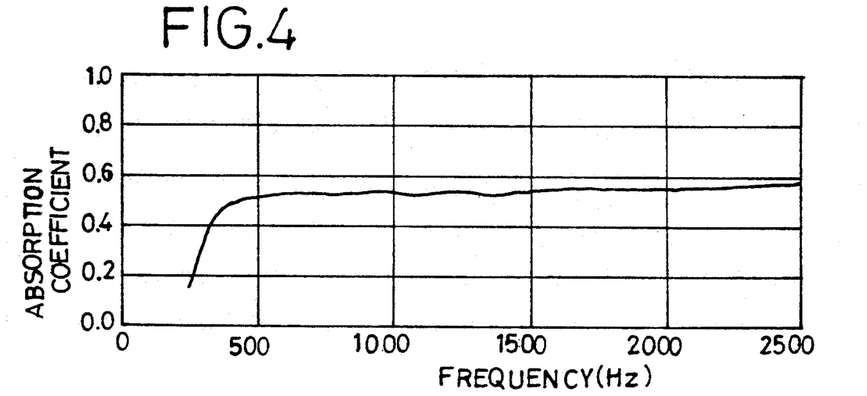

It will be also useful to employ powder particles having a substantially constant sound absorption coefficient at frequencies above a predetermined level as shown in FIG. 4. For the powder particles in this case, it is possible to employ vermiculite, silica, mica, soft calcium carbonate, barium ferrite or the like of a bulk density of 0.1 to 3.0 g/cm$^3$ or, preferably, 0.1 to 1.0 g/cm$^3$.

Further, the center frequency fr at the absorption peak which appears in the low frequency range, the sound absorption coefficient value at this center frequency the, frequency width of the absorption peak and so on are variable depending on the particular diameter and shape of the powder particles employed, the bulk density for the layered powder particles, the agglomerating state of the powder particles and so on. Here, a shift of the center frequency fr of the absorption peak, if possible, to an even lower frequency may allow a further useful sound absorptive material to be provided.

An empirical confirmation has been made in respect that the center frequency fr of the sound absorption peak in the low frequency range at the powder particle layer can be obtained basically by means of a following formula (1):

$$fr = 0.25 t^{-1} (E/\rho)^{0.5} \tag{1}$$

in which t denotes the thickness of the powder particle layer, E is the Young's modulus of the powder particle layer, and $\rho$ is the bulk density of the layer.

While it is seen from this formula (1) that the center frequency fr may be lowered by enlarging either the thickness t or the bulk density $\rho$ of the powder particle layer, such measures are undesirable since the enlargement of the thickness causes the room or flow path space to be decreased and the enlargement of the bulk density $\rho$ results in a deterioration of the sound absorption coefficient due to the vibration of the powder particles being restrained. On the other hand, it will be clear from the formula (1) that the center frequency fr can be lowered by reducing the Young's modulus E instead of the enlargement of either the thickness t or the bulk density $\rho$ of the powder particle layer. In other words, it is possible to lower the center frequency fr by combining the Young's modulus of the powder particle layer which is normally over 10$^5$N/m$^2$ with a porous support of a lower Young's modulus, i.e., below 10$^5$N/m$^2$.

Since it has been found that the Young's modulus E of the powder particle layer is largely influenced by the spring constant between mutually contacting powder particles, the Young's modulus can be optimumly reduced for the entire powder particle layer by preparing this powder particle layer with the powder particle contained in a porous support of the Young's modulus less than 10$^5$N/m$^2$ which is employed as the base of the sound absorptive material.

Figure 1:
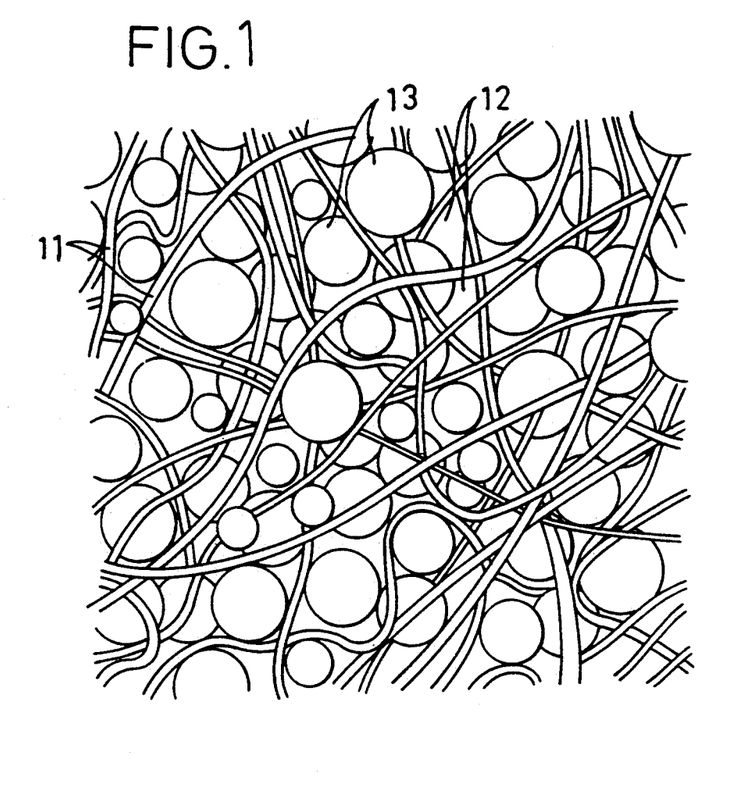
FIG. 1 is a diagram showing schematically an inner structure in an embodiment of the sound absorptive material according to the present invention.

Accordingly, a porous support 11 in such aspect of fibers mutually entangling complicatedly as shown in FIG. 1 is made to contain powder particles 13 in a vibratable manner, so as to prepare the powder particle layer and eventually the sound absorptive material.

Figure 2:
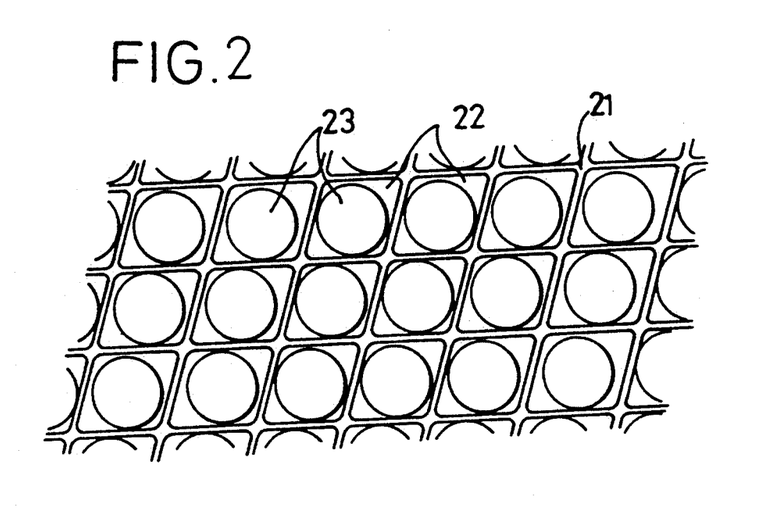
FIG. 2 is a diagram showing schematically an inner structure in another embodiment of the sound absorptive material according to the present invention.

Further, the sound absorptive material can be prepared with the powder particle layer formed, as shown in FIG. 2, with a porous support 21 in which many pores 22 disposed in vertical and horizontal arrays and with powder particles 23 respectively contained in all or at least part of the pores 22 of the porous support 21.

For the porous support to be employed in the sound absorptive material according to the present invention of these arrangements, it is possible to employ, for example, a nonwoven fabric, fibrous structure, artificial pulp, filter paper or the like which is optimumly in the form of sheet about 5–40 mm thick. When the thickness is insufficient, the porous support may be a stack of a plurality of such sheets. For the porous support, further, it is also possible to employ such fibrous structure as glass-wool, rock wool or the like, such foamed resin material as foamed urethane or the like, and so on, which may also be in the form of sheet.

In an event where the nonwoven fabric is employed as the porous support employed in the present invention, it is possible to employ one of polyester 25 $\mu$m in the fibrous diameter, 0.011 g/cm$^3$ in the bulk density and 2.1×10$^3$N/m$^2$ in the Young's modulus, one of polyester 25 μm in the fibrous diameter, 0.0013 g/cm³ in the bulk density and 2.5×10³N/m², or one of polyester 25 μm in the fibrous diameter, 0.014 g/cm³ in the bulk density and 9×10³N/m². For the powder particles in this case, it is also possible to effectively employ mica powder particles, vermiculite powder particles, ultrafine acrylic powder particles, spherical silica powder particles or the like. More specifically, talc powder particles of 2.3 to 9.4 μm in the average particle diameter, 2.75 g/cm³ in the true density, 0.25 to 0.45 g/cm³ in the bulk density and 0.84 to 0.91 in the void volume, the spherical silica powder particles of 3 to 28 μm in the average particle diameter, 2.23 g/cm³ of the true density, 0.31 to 0.92 g/cm³ in the bulk density and 0.59 to 0.86 in the void volume, and the like may be employable.

Figure 6:
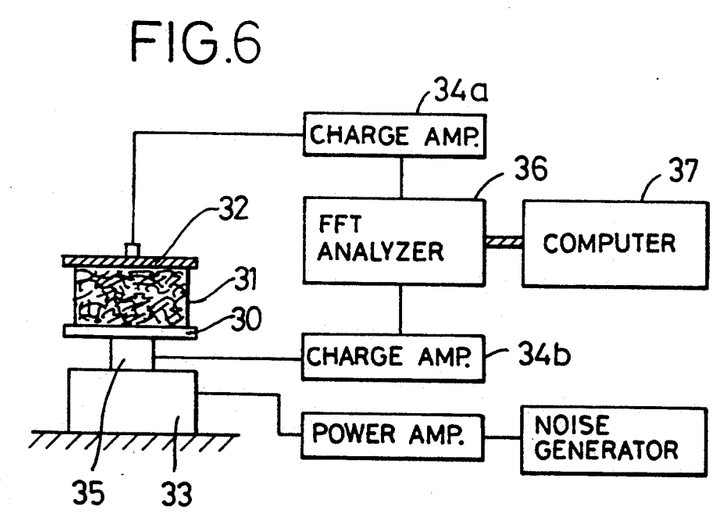
FIG. 6 shows in a block diagram a system for measuring Young's modulus.

In measuring the Young's modulus of the foregoing porous supports, as shown in FIG. 6, the porous support 31 subjected to the measurement is placed within a vibration plate or pot 30, and an additional mass member 32 is disposed on the support 31. Then the pot 30 is vibrated with an exciter 33, and a transmission function between the vibration acceleration of an impedance head 35 and the vibration acceleration of the additional mass member 32 is taken through charge amplifiers 34a and 34b by an FET amalyzer 36. At last, the Young's modulus can be computed at a personal computer 37 from the frequency of peaks of the transmission function. By the way, this measuring arrangement of FIG. 6 may be used not only for the measurment of the Young's modulus for the porous support alone but also for the Young's modulus measurement for the powder particle layer or the porous support into which the powder particles are introduced.

Figure 7:
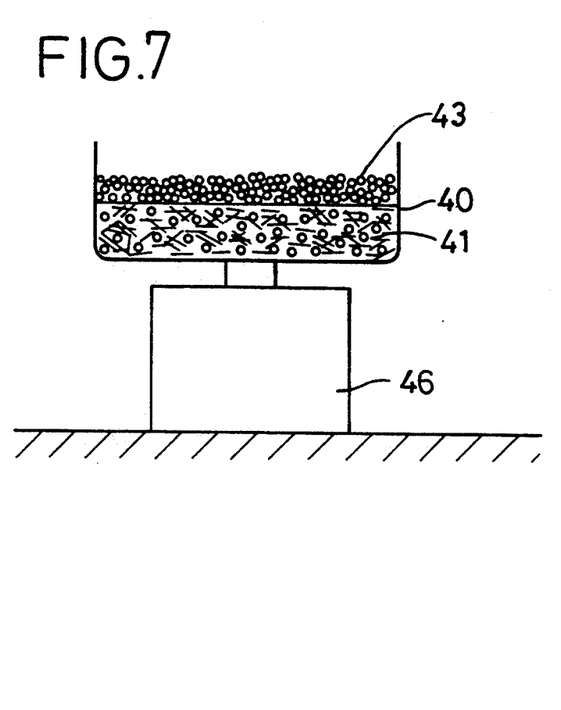
FIG. 7 is an explanatory view for an example of a method for manufacturing the sound absorptive material of the present invention.

For a method of manufacturing the sound absorptive material, such an arrangement as shown in FIG. 7 may be employed, in which, so long as the outer dimensions are not demanded to be too large, the porous support 41 is placed in a container 40, the powder particles 43 are placed on the support 41, the whole is vibrated with the vibrator 46 and the powder particles 43 are caused to be contained within the pores of the porous support 41.

Further, the sound absorptive material according to the present invention should to sufficiently contain the powder particles therein, but it is inconvenient that the powder particles exceed 90 volume %, in maintaining the powder particles to be vibratable. Here, the porous support is made to be of an arrangement in which the support is 5 volume % and the rest will be the void.

Figure 8:
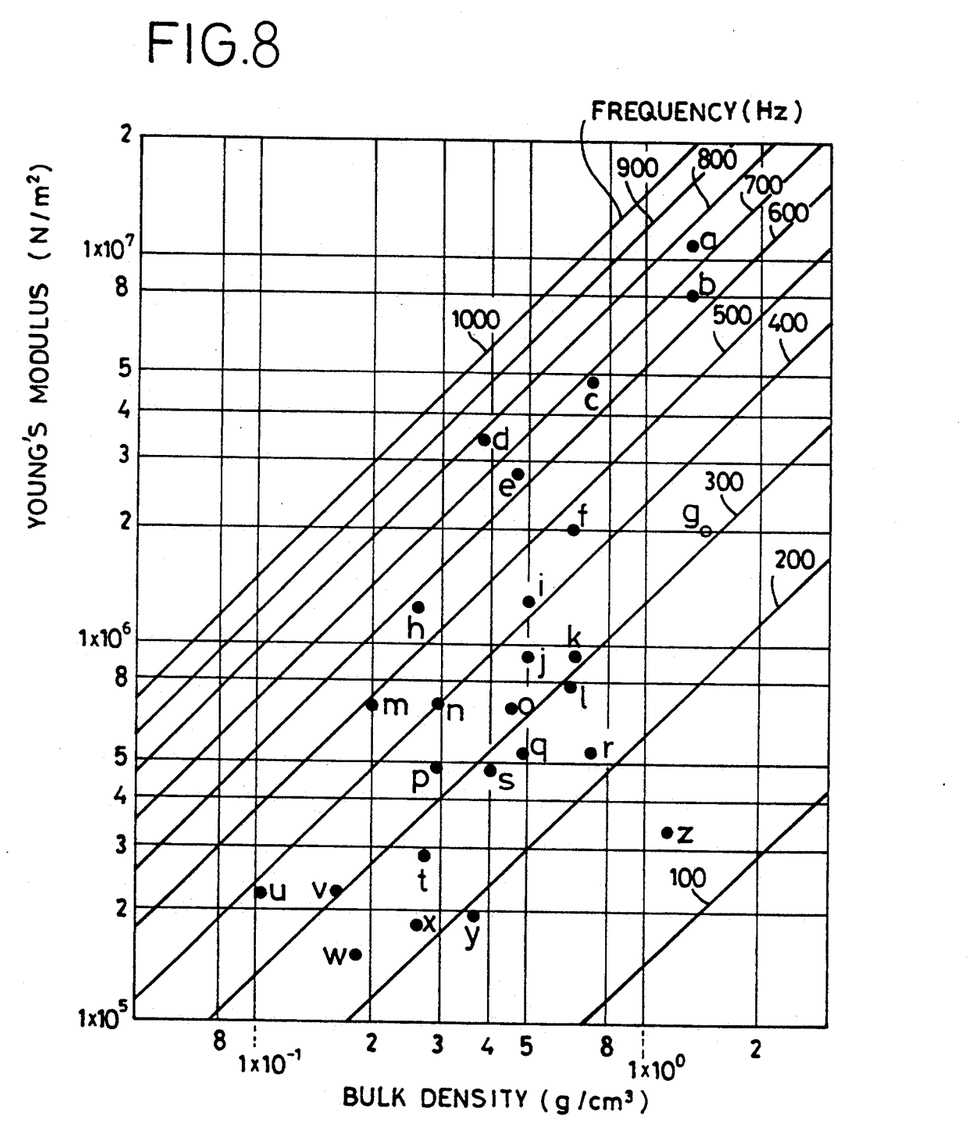
FIG. 8 is a diagram showing Young's modulus with respect to bulk density of various powder particles layers employed in the sound absorptive material according to the present invention.

In FIG. 8, there are shown the Young's moduli of various powder particle layers employed in the present invention, in which diagonal axes denote the frequencies at sound absorption peaks. Further in the drawing, dot a denotes electrofused magnesia powder particles, dot b calcium carbonate powder particles, dots c and f polymethacrylate resin powder particles, dots d and y polytetrafluoroethylene fine powder particles, dot e whole milk powder particles, dot g barium ferrite powder particles, dots h and m Shirasu baloon powder particles, dot i oil furnace black powder particles, dot j hard wheat flour, dots k and l chloride process titanium dioxide powder particles, dot n crystalline cellulose powder particles, dot o soft wheat flour, dot p lycopodium spores, dots g and s nylon powder particles, dot r bentonite powder particles, dots u and v expanded perlite powder particles, dots t and w silica powder particles, and dot x natural amorphous graphite. Here, the respective powder particle layers were made to be 30 mm thick.

Various sound absorptive materials were prepared in accordance with the foregoing manufacturing method of FIG. 7, with various nonwoven fabrics respectively of the Young's modulus below 10⁵N/m² and in the form of sheet of 5 to 40 mm thick as the porous support and with various powder particles of precipitated silica and so on of 10 to 500 μm in the average particle diameter as the powder particles, while keeping the powder particle amount not to exceed 90 volume %. Observation of sound absorbing characteristics in respect of these various sound absorptive materials thus obtained has proved that they are excellent in the sound absorbing characteristics in the low frequency range.

EXAMPLE 1

In accordance with the manufacturing method of FIG. 7, a polyester nonwoven fabric of 25 μm in average fibrous diameter, 0.011 g/cm³ in bulk density 2.1×10³N/m² in Young's modulus as the porous support was made to contain vermiculite of 180 to 250 μm in the particle diameter, 0.171 g/cm³ in the bulk density and 2.8×10⁵N/m² in the Young's modulus, keeping the powder particle amount not to exceed 90 volume %, and a sound absorptive material of 0.180 g/cm³ in the bulk density and 1.62×10⁵N/m² in the Young's modulus was obtained.

Figure 9:
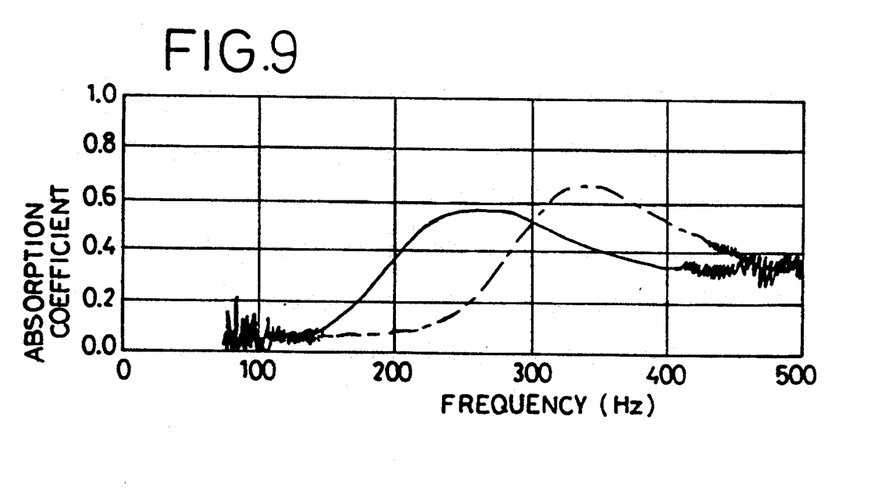
FIG. 9 is a diagram showing characteristics of the sound absorption coefficient with respect to the sound frequency of still another sound absorptive material according to the present invention.

As the result of observation of the sound absorbing characteristics in respect of this sound absorptive material obtained through the above Example 1, it has been found, as shown in FIG. 9, that the center frequency was lowered to be closer to 250 Hz in the case of Example 1 (denoted by a solid line curve) in contrast to a sound absorptive material relying only on a layer of vermiculite (denoted by a broken line curve), and the sound absorptive material of Example 1 was made excellent in the sound absorbing characteristics in the low frequency range.

Figure 10:
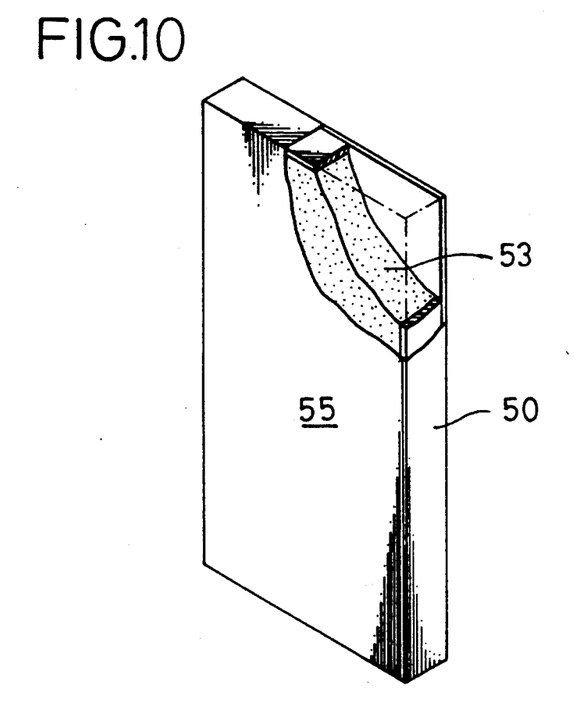
FIG. 10 shows in a perspective view with a part removed of the sound absorptive material in another embodiment according to the present invention.

According to another feature of the present invention, the sound absorptive material may be prepared by having the powder particle layer 53 contained in the nonwoven fabric as in the foregoing, filling a box 50 opened fully on one side with the powder particle layer 53, and covering the open side of the box 50 by a sheet 55 acoustically transparent, as shown in FIG. 10. For the box 50, suitable materials include wood, gypsum board, calcium silicate plate, cemented wood-wool plate, cemented wood chips or the like, and, for the sheet 55, air-permeable fabric of saran cloth, glass cloth or the like, or a synthetic resin sheet less than about 0.05 mm in thickness of polyethylene, vinyl or the like.

Figure 11:
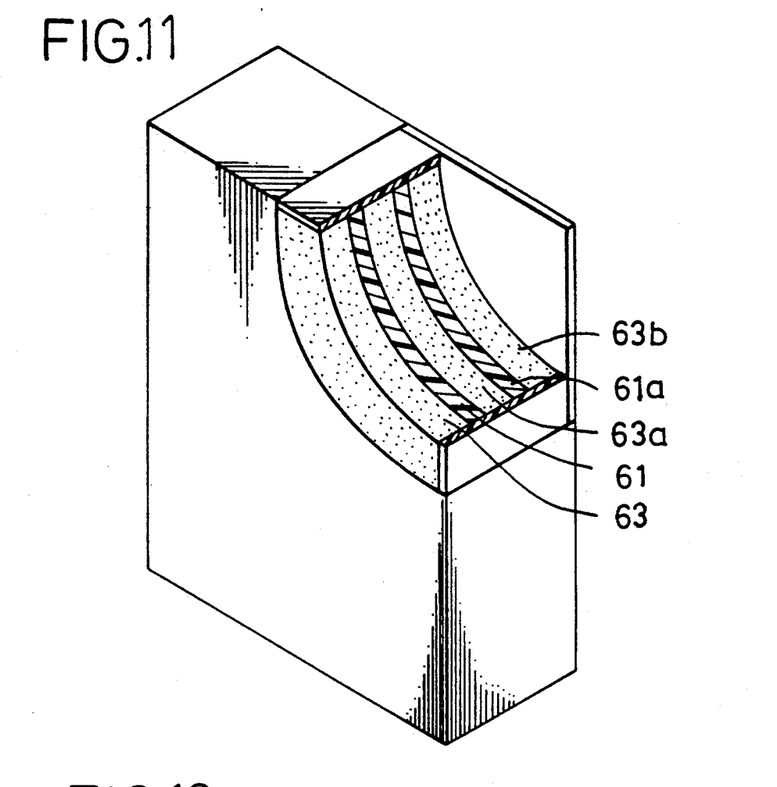
FIG. 11 shows in a perspective view with a part removed of the sound absorptive material in a further embodiment according to the present invention.
Figure 12:
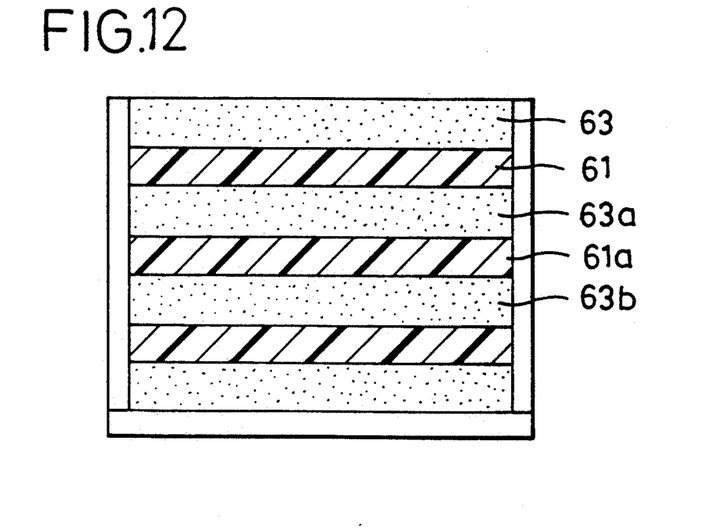
FIG. 12 is a schematic sectioned view of the sound absorptive material shown in FIG. 11.

Further, according to another working aspect of the present invention as shown in FIG. 11, three powder particle layers 63, 63a and 63b, for example, are stacked with sheet-shaped porous supports 61 and 61a interposed between the respective layers, the stacked layers 63-63b and supports 61 and 61a are accommodated within the box 60 opened on one side, the open side of the box 60 is closed by the acoustically transparent sheet 65, and a sound absorptive material is thereby completed. In this case, it is possible to arrange the porous support and powder particle layer in a set, and to increase the number of the powder particle layers as occasion demands, as shown in FIG. 12.

EXAMPLE 2

A sound absorptive material was formed by stacking four powder particle layers on each other with three porous supports interposed respectively between the powder particle layers, so that the total thickness was 30 mm. For the powder particle layer, silica powder of an average particle diameter of 150 μm was employed, while keeping the respective layer to be about 5 mm thick. For the porous support, the ones of the glass wool of 3 mm thick each were used.

Figure 13:
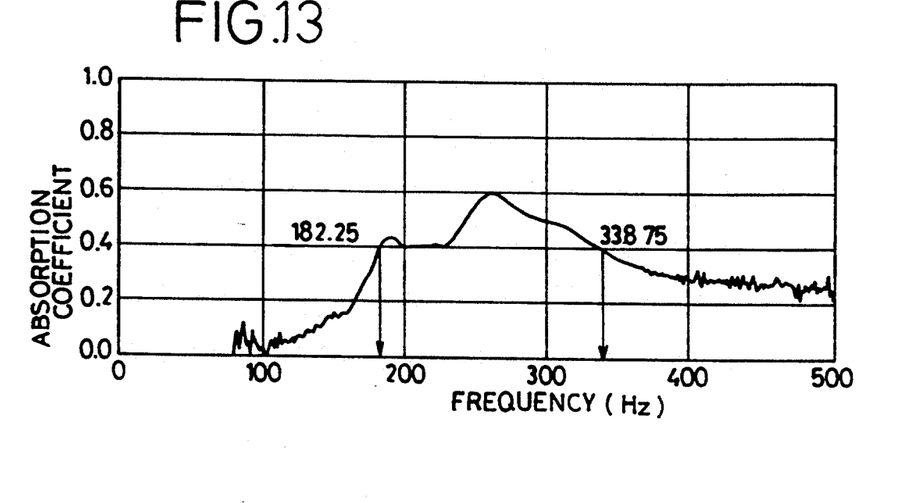
FIG. 13 is a diagram showing the characteristics of the sound absorption coefficient with respect to the sound frequency in the sound absorptive material shown in FIG. 11.

In the case of this sound absorptive material thus formed through this Example 2, the characteristics of the sound absorption coefficient with respect to the sound frequency attained by means of the sets of the powder particle layers and porous supports were as shown in FIG. 13, in which there was proved that the sound absorptive material was excellent in the sound absorbing characteristics in the low frequency range.

According to a further feature of the present invention, there can be formed a powder particle layer in which the powder particles present a remarkable peak value in the frequency characteristics. In this case, the porous support employed is one in which thin fibers of nylon, for example, are entangled about the periphery of polyurethane fiber, for example, and the powder particles of silica or the like are caused to be contained in this porous support. In this arrangement, the porous support shows relatively flexible spring properties, whereby the powder particle layer as a whole is caused to be smaller in the spring action and the sound absorbing frequency range can be effectively shifted to a lower frequency.

EXAMPLE 3

A porous support was prepared by irregularly stacking fibers of 1.19 g/cm$^3$ true density and consisting of nylon of about 10 μm diameter entangled about polyurethane fibers of about 100 μm diameter. This porous support showed a void volume of 98.6% and a Young's modulus of $7.56 \times 10^3$ N/m$^2$. A powder particle layer was formed with such porous support made to contain therein silica powder particles of 150 μm in the average particle diameter, and the same box as that shown in FIG. 10 was used to prepare a sound absorptive material.

In respect of the sound absorptive material prepared through this Example 3, it has been found that the same was excellent in the sound absorbing characteristics more in the lower frequency range.

Figure 14:
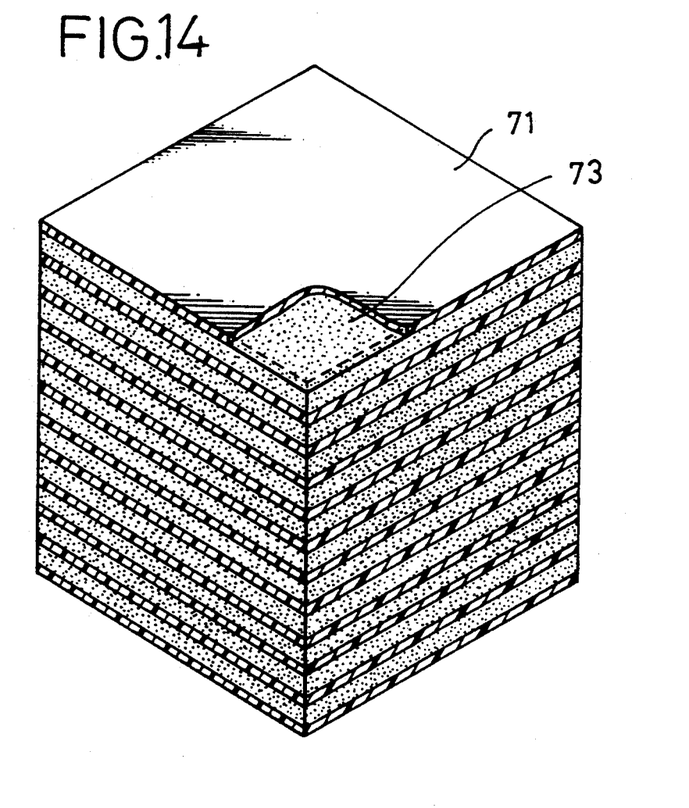
FIGS. 14 and 15 show respectively in a perspective view with a part removed further embodiments of the sound absorptive material according to the present invention.

According to still another feature of the present invention, a sound absorptive material can be provided, which sound absorbing characteristics are stabilized by means of a stack of a plurality of layers of the powder particles performing the sound absorbing action through their vibration, with sheet members interposed between them, which sheet members having enough denseness as not allowing the powder particles to pass therethrough. That is, as shown in FIG. 14, the sheet members 71 and powder particle layers 73 are alternately stacked on each other, so that the sheet members 71 which do not allow the powder particles to pass therethrough will effectively prevent in particular the powder particles from being deviately concentrated to one part area, and being thereby caused to vary in the sound absorbing characteristics. For the sheet member 71, nonwoven fabric, woven fabric, knitted web or the like may be employed, so long as the member has surface openings which are very fine and smaller than the powder particles. And for the powder particles, for example, a particle diameter in a range of 0.1 to 1,000 μm, a bulk density in a range from about 0.1 g/cm$^3$ to about 1.5 g/cm$^3$ may be employed. It should be appreciated that such stack as shown in FIG. 14 should preferably be housed within such box as shown in FIG. 11, so as to prepare the sound absorptive material.

Figure 15:
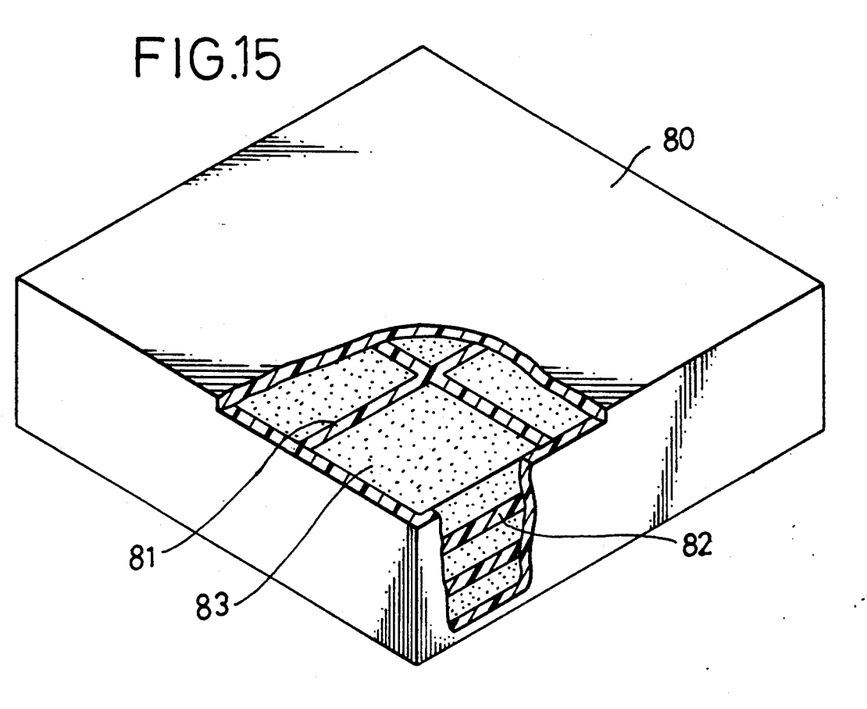

In order to further reduce the fluidity of the powder particles forming the stack of the powder particle layers, there may be provided an arrangement such as shown in FIG. 15, in which partitions 81 extending in directions perpendicular to the sheet members 82 arranged within the box 80 and the powder particle layers 83 are accommodated within the spaces defined by the partitions 81 and the sheet members 82.

EXAMPLE 4

A sound absorptive material was prepared by stacking a plurality of nonwoven fabrics about 15 μm in the average fibrous diameter 0.13 g/cm$^3$ in the bulk density and 0.4 mm in the thickness, alternately with the powder particle layers respectively 2.2 mm thick and consisting of vermiculite of the average particle diameter of 63 μm, so that the powder particle layers were eleven and the total thickness was 31 mm, and placing the stack into such box as shown in FIG. 11.

Investigation of the characteristics of the sound absorption coefficient with respect to the sound frequency in respect of this sound absorptive material prepared through this Example 4 has proved that constant sound absorption characteristics were attained, based on measurements repeated many times.

Figure 16:
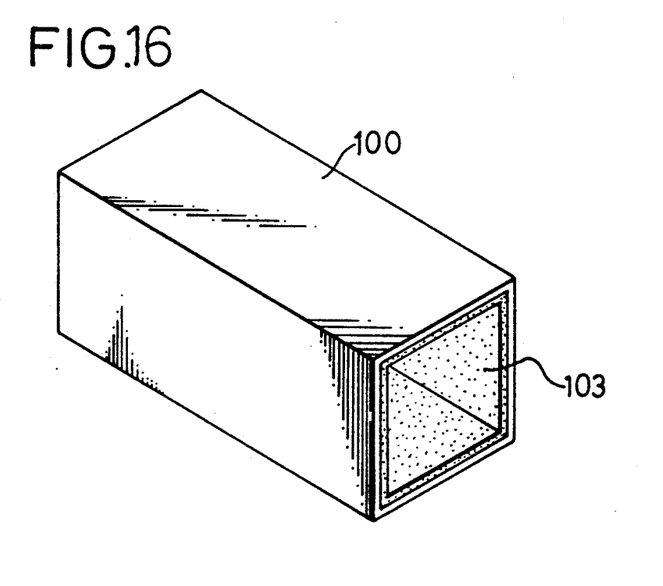
FIG. 16 shows schematically in a perspective view an application example of the sound absorptive material according to the present invention.

Further, it should be readily appreciated that, while use of the sound absorptive material containing the powder particles in normal arrangement as an inner liner 103 of a duct or conduit member 100 such as shown in FIG. 16 will be apt to cause the powder particles to deviate and concentrate in a particular area, the sound absorptive material shown in FIGS. 14 and 15 in particular should be useful when used in such duct member.

What is claimed is:

1. A sound absorptive material comprising at least one layer of powder particles having a sound absorption coefficient in a frequency range below about 500 Hz supported in a vibratable state by at least one porous support.

2. The sound absorptive material of claim 1 wherein said at least one porous support comprises a plurality of porous supports and said at least one powder particle layer comprises a plurality of powder particle layers which are mainly disposed alternately between said plurality of porous supports.

3. The sound absorptive material of claim 1 wherein said at least one powder particle layer supported by said at least one porous support is disposed within a box, at least one side of which is acoustically transparent.

4. The sound absorptive material of claim 2 wherein said plurality of powder particle layers said plurality of said porous supports are disposed within a box, at least one side of which is acoustically transparent.

5. The sound absorptive material of claim 1 wherein said powder particles have a sound absorption coefficient which abruptly rises and falls in said frequency range.

6. The sound absorptive material of claim 1 wherein said powder particles include talc, calcium silicate, silica, vermiculite, mica, soft calcium carbonate, barium ferrite, acrylate or methacrylate resin.

7. The sound absorptive material of claim 1 wherein said powder particles are vermiculite.

8. The sound absorptive material of claim 1 wherein said powder particles are silica.

9. The sound absorptive material of claim 1 wherein said powder particles have a bulk density of 0.1 to 3.0 g/cm$^3$.

10. The sound absorptive material of claim 1 wherein said at least one porous support has a Young's modules of less than about $10^5$ N/m$^2$.

11. The sound absorptive material of claim 1 wherein said powder particles occupy no more than about 90 volume % of said sound absorptive material.

12. The sound absorptive material of claim 1 wherein said powder particles have average particle diameters of about 10 to about 500 $\mu$m.

13. The sound absorptive material of claim 1 wherein at least a portion of said powder particles are retained within pores of said porous support.

14. The sound absorptive material of claim 13 wherein said porous support comprises a non-woven fibrous material.

15. The sound absorptive material of claim 13 wherein the thickness of said porous support is about 5 to about 40 mm.

16. The sound absorptive material of claim 1 wherein the thickness of said porous support is no more than about 3 mm.

17. The sound absorptive material of claim 11 wherein said porous support occupies about 5 volume %.

18. The sound absorptive material of claim 1 comprising a plurality of layers of powder particles arranged alternately with a plurality of porous supports, said porous supports having a thickness of no more than about 3 mm and being of such density and pore size as to prevent passage of powder particles therethrough.

19. The sound absorptive material of claim 18 wherein said plurality of layers of powder particles and alternately arranged porous supports are contained within a housing, at least one side of which is acoustically transparent.

20. The sound absorptive material of claim 18, further including a plurality of partitions arranged perpendicular to said porous supports and thereby defining, with said porous supports, a plurality of chambers containing and dividing said layers of powder particles.

* * * * *